April 13, 1954
W. W. WOHLFORTH
2,675,200
SUPPORT FOR WHEEL BALANCING DEVICES
Filed May 24, 1948
4 Sheets-Sheet 1
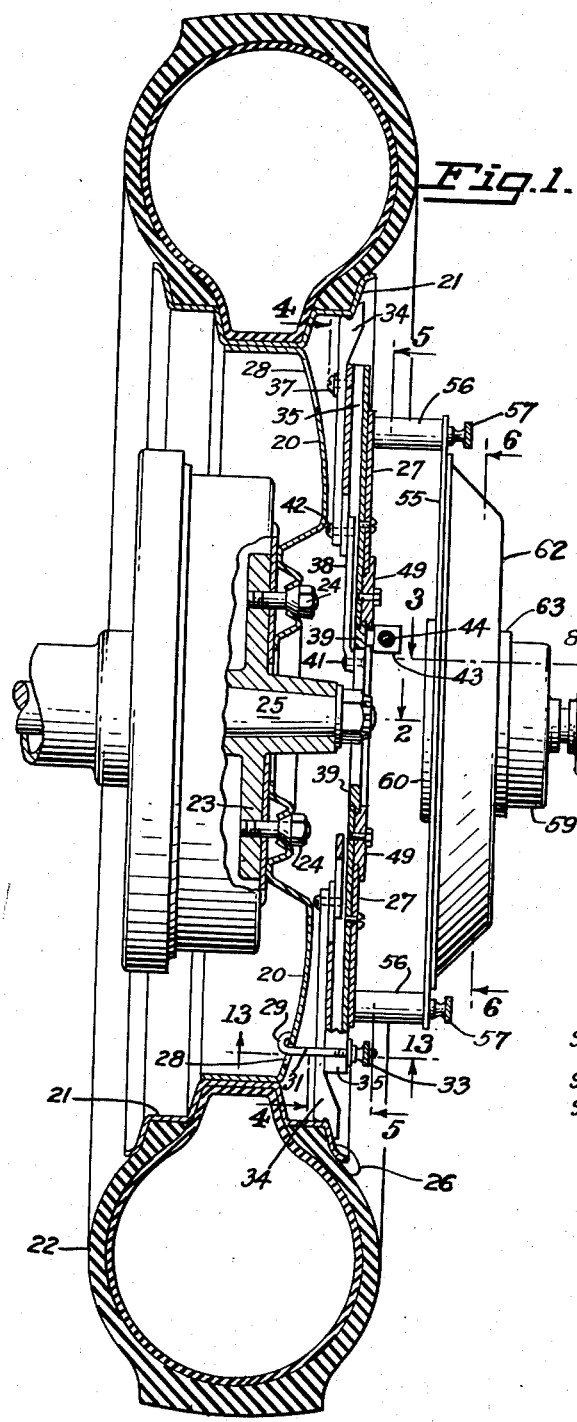
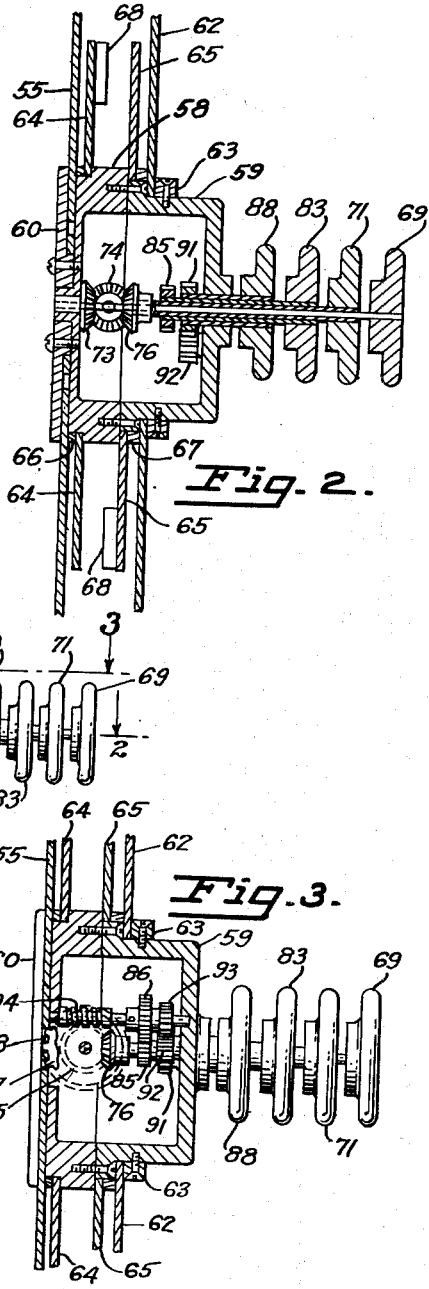
INVENTOR.
WALTER W. WOHLFORTH
BY
*Stephen S. Townsend*
ATTORNEY April 13, 1954
W. W. WOHLFORTH
2,675,200
SUPPORT FOR WHEEL BALANCING DEVICES
Filed May 24, 1948
4 Sheets-Sheet 2
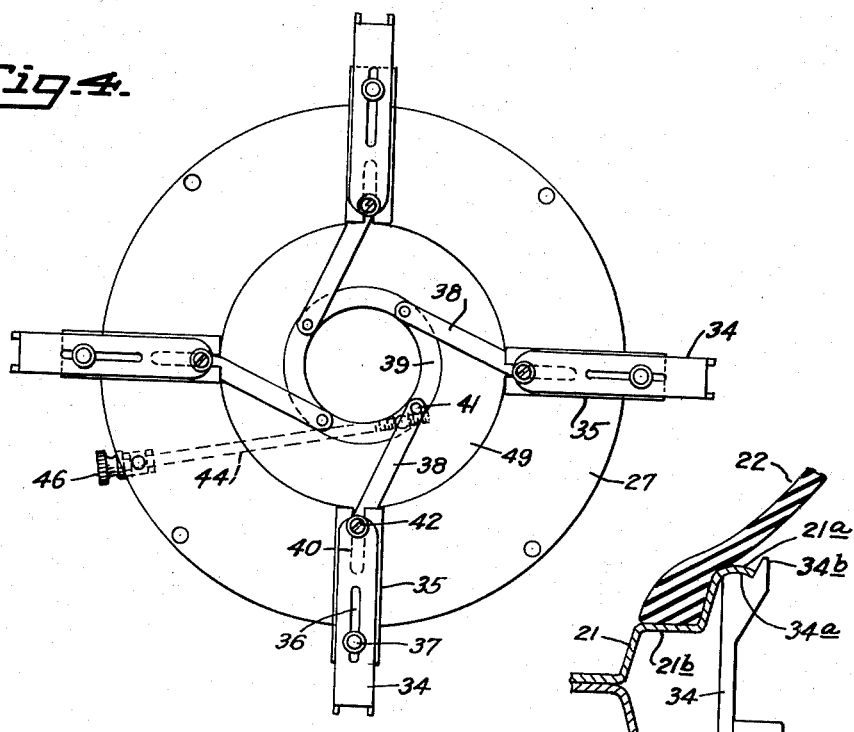
INVENTOR.
WALTER W. WOHLFORTH
BY
Stephen S. Townsend
ATTORNEY April 13, 1954   W. W. WOHLFORTH   2,675,200
SUPPORT FOR WHEEL BALANCING DEVICES
Filed May 24, 1948   4 Sheets-Sheet 3
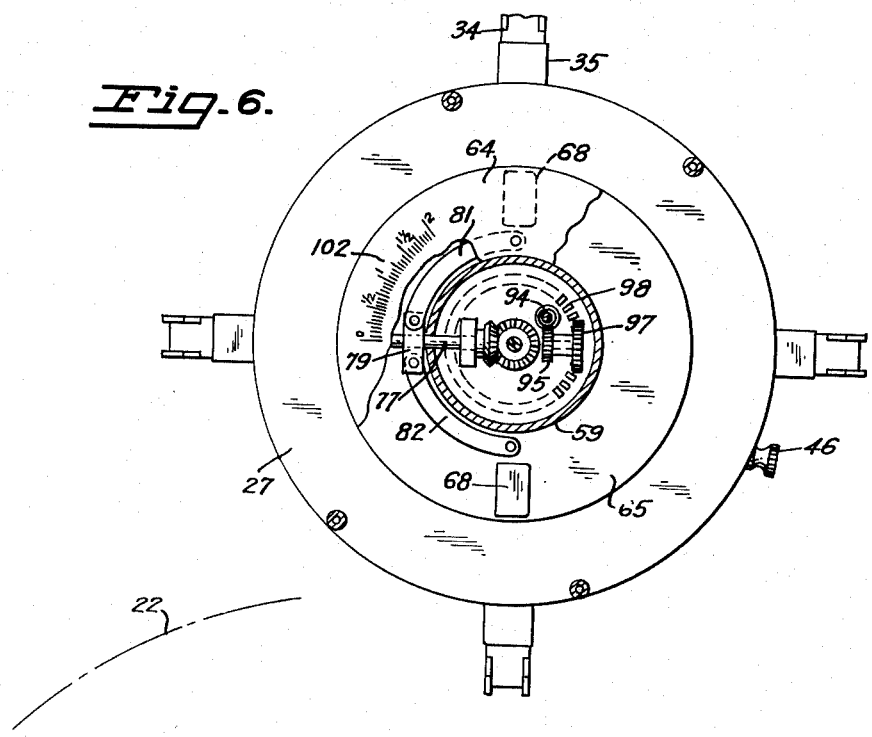
INVENTOR.
WALTER W. WOHLFORTH
BY
Stephen P. Townsend
ATTORNEY

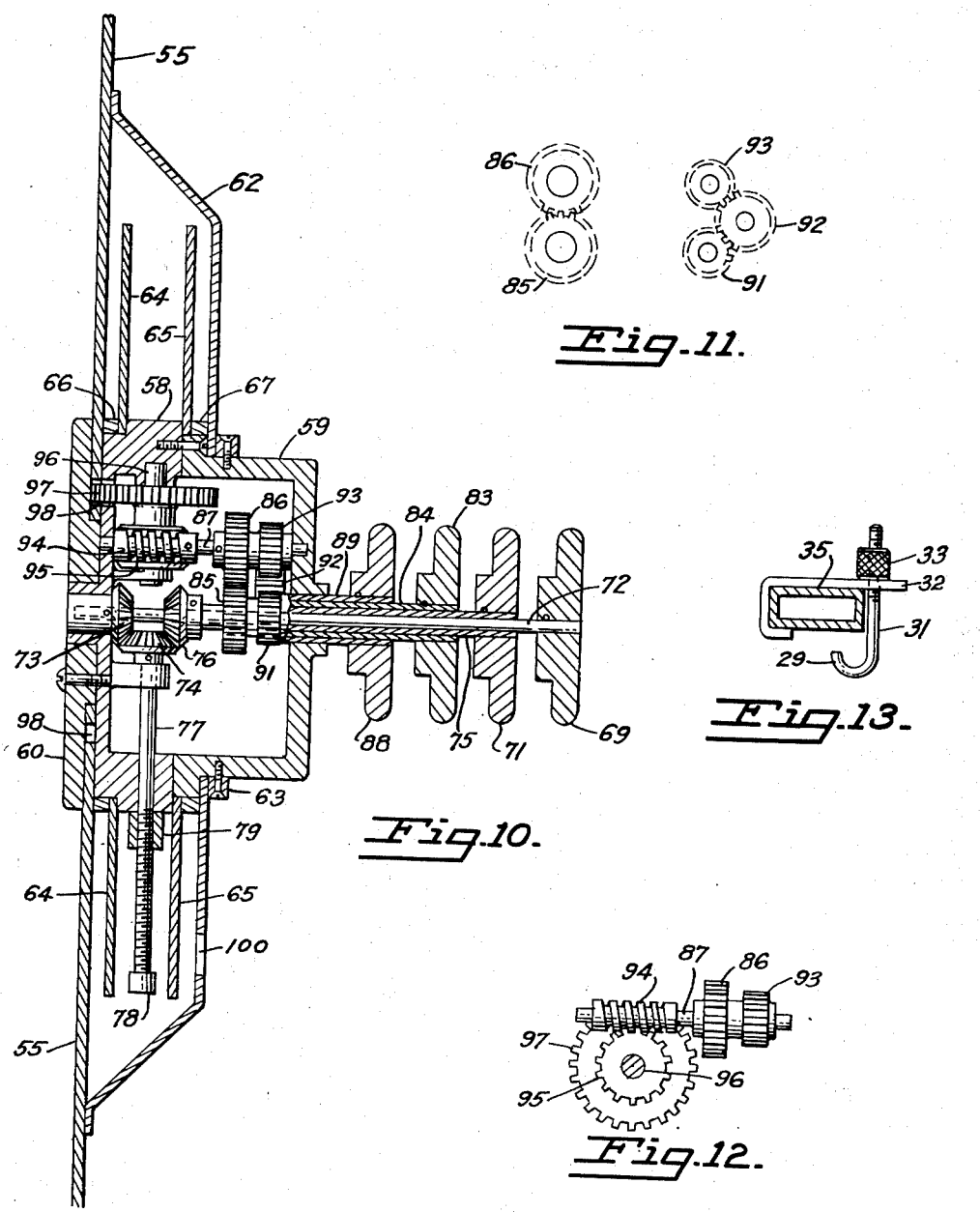

Patented Apr. 13, 1954

2,675,200

UNITED STATES PATENT OFFICE 2,675,200

SUPPORT FOR WHEEL BALANCING DEVICES

Walter W. Wohlforth, San Francisco, Calif.

Application May 24, 1948, Serial No. 28,932

7 Claims. (Cl. 248—201)

This invention relates to apparatus for correcting the dynamic unbalance of vehicle wheels and particularly to an apparatus for determining the dynamic unbalance of a road wheel of an automotive vehicle when said wheel is positioned in operative position on a vehicle.

The primary object of the present invention is the provision of a device for determining the position and mass of a counterweight to be applied to a vehicle road wheel to correct the dynamic unbalance of the wheel.

A principal object is to provide wheel balancing apparatus, as aforesaid, which may be secured to a road wheel in a manner to prevent displacement thereof relative to the wheel and which displacement might otherwise cause serious injury to the users thereof.

A further and very important object is to provide a wheel balancing apparatus provided with means to center the apparatus relative to the axis of rotation of a wheel tested and at the same time, and by said means, connect said apparatus securely to the said wheel.

One of the objects of the invention is to provide mechanism for bringing a wheel into dynamic balance while the wheel is rotating and then to afford convenient readings of the adjustable parts so as to indicate the position and mass of the required counterweight.

Another object of the invention is the provision of a plurality of manual adjustments which may be actuated while the wheel is rotating in order to balance the wheel.

A further object of the invention is the provision of a plurality of revolving weights which may be adjusted at the control of the operator both angularly with respect to each other and relatively with respect to the wheel to which they are attached so as to bring the wheel into balance.

Another object of the invention is the provision of means for rapidly and securely attaching and centering the balancing mechanism with respect to the wheel being balanced.

A further object of the invention is to provide mechanism consisting of two separable parts which may be conveniently, securely and accurately assembled together, one part carrying means for securely, accurately and rapidly securing said part to the wheel of the vehicle being balanced and the other part including the adjustable balancing mechanism.

Another important object of the present invention is to provide a wheel balancing device of the character mentioned which is provided with means to locate the position or location of dynamic unbalance of a wheel being tested by an accurate mechanism correlated with a conveniently accessible indicator means.

A further object is to provide a wheel balancing apparatus arranged for secure attachment to the road wheel of a vehicle and which said apparatus is provided with a plurality of arms movable radially relative to the apparatus in order to center said apparatus with respect to the axis of rotation of the wheel being tested. Convenient control means is provided to operate the centering arms in unison in order to insure rapid accurate centering of the apparatus, as aforesaid.

A further and more specific object of the present invention is to provide apparatus for determining the dynamic unbalance of the road wheel of an automotive vehicle so accurately, as to location and the position of unbalance and amount of weight necessary to correct the unbalance, that only one counterbalance weight need be affixed to the rim of the wheel tested in order to correct the unbalance thereof. Heretofore, a plurality of weights affixed to the wheel rim was the rule rather than the exception in view of the inaccuracy in determining the precise location and weight necessary to correct the undesirable unbalance.

A further object is to provide a safe, relatively inexpensive wheel balancing means which is sturdy of construction and design and which may be used successfully by persons who are relatively unskilled operators.

Other objects and advantages of the invention will become apparent upon referring to the specification and drawings in which similar characters of reference represent corresponding parts in the several views.

Fig. 1 is a vertical sectional view of the device attached to a vehicle road wheel in operative position on a vehicle;

Fig. 2 is an enlarged sectional view taken on line 2—2 of Fig. 1;

Fig. 3 is a sectional view taken on line 3—3 of Fig. 1;

Fig. 4 is a sectional view taken on line 4—4 of Fig. 1;

Fig. 5 is a sectional view taken on line 5—5 of Fig. 1 with the device removed from the vehicle wheel;

Fig. 6 is a sectional view taken on line 6—6 of Fig. 1 with the device removed from the vehicle wheel;

Fig. 7 is a front elevational view of the device;

Fig. 8 is a fragmentary view of a modification of a means to attach the device to a wheel;

Fig. 9 is a sectional view taken on line 9—9 of Fig. 8;

Fig. 10 is an enlarged sectional view taken on line 10—10 of Fig. 7;

Fig. 11 is a schematic view of gears employed to rotate the housing in opposite directions;

Fig. 12 is a view taken on line 12—12 of Fig. 10 showing gears employed to rotate said housing;

Fig. 13 is a sectional view taken on line 13—13 of Fig. 1; and

Fig. 14 is an enlarged fragmentary sectional view of a preferred means of attachment of the wheel balancing device to the rim of a vehicle road wheel and specifically the rim portion thereof.

The present invention is designed to locate the position and determine the mass of counterweights to be applied to vehicle wheel rims in order to correct the dynamic unbalance which may exist in said wheels. Unbalance frequently occurs in automobile wheels as the result of collisions, forcibly hitting the wheel against a curb or other obstruction, wear of parts and for various other reasons. When such unbalance occurs, unpleasant and dangerous vibrations result and, further, the wear of the tires becomes excessive and uneven. It is, therefore, desirable to correct the unbalance by positioning a counterweight of lead on the rim of the wheel, but it is first necessary to determine the point on the rim where the weight must be positioned and the mass of the required weight. "Cut-and-try" methods are time consuming and sometimes unsuccessful. The present invention provides a rapid and accurate means for balancing wheels.

It will be understood that automobile wheels vary in design, but for purposes of illustration there is shown in Fig. 1 a common type wheel consisting of a flange 20 to which is fixed a rim 21 carrying a pneumatic tire 22. The flange 20 is attached to a hub 23 by means of lug bolts or lug nuts 24 so that the entire wheel may be dismounted and the hub 23 is secured to an axle 25 which is, in turn, suitably mounted in the vehicle frame. Assuming such a wheel to have become dynamically unbalanced, the problem is to place a lead weight 26 of proper mass at the proper point on the rim 21.

The first step in the balancing operation in accordance with the teaching of the present invention is the positioning and fastening of an annular main plate 27 to the wheel. As has been stated, the design of vehicle wheels varies and the method of attachment of the main plate 27 depends upon the particular wheel being balanced. The common type wheel, shown in Fig. 1, has a plurality of arcuate slots 28 in the flange 20 and by use of these slots the plate may be fastened through the instrumentality of a plurality of hooks 29 which are inserted through the slots 28 and grip the underside of the flange 20. As illustrated in Fig. 13, the shanks 31 of the hooks 29 extend through holes in clamps 32 and carry nuts 33 on the threaded ends thereof. The clamps 32 fit about hollow supports 35, carried by the plate 27 as hereinafter more fully appears, and by tightening the nuts 33 it is possible to hook the plate 27 securely to the wheel. Hooks 29 may also be used in conjunction with spoked wheels as by hooking around the spokes.

All vehicle wheels do not have slots or other apertures in the flanges thereof or spokes and hence different devices for attaching the main plate 27 must be employed. In Figs. 8 and 9 the main plate 27 is shown attached by means of the lug nuts 24. An extension member or nut-forming member 201 in which is a transverse slot 202 of a width equal to the width across the flats of the hexagonal head of lug nut 24 has a necked-in portion 203 having a lesser interior diameter than the width of the slot 202. The necked-in portion is arranged to fit about and engage the tapered conical portion 204 of the lug nut 24 which is intermediate the hexagonal head and the shank 205 of the lug nut 24. Diametrically opposed flats 206 are cut into the extension member 201 adjacent the opposite end thereof so as to accommodate a spanner wrench. Obviously, the extension member 201 may be formed from hexagonal stock in order to take a wrench jaw. The extension member 201 is slid over the hexagonal head of the lug nut 24 and is held firmly against the flange 20 when the extension member and the lug nut are tightened by turning of the spanner wrench. The plate 27 is then fixed to the extension members 201 by bolts 207 inserted through spaced holes 208 provided in split plate 49. As used herein the term "wheel flange" means road wheel structure including the hub 23 and the lug nut 24. It will be understood that in some wheel constructions the hexagonal portions are formed on lug bolts threaded into tapped holes in the hub 23 and the member 201 may be attached to such lug bolts in the same manner as to lug nut 24. As used in this specification and in the appended claims, the terms "lug" and "lug nut" are synonymous.

A preferred form of attachment of the balancing device, and specifically plate 27 thereof, to a road wheel of a vehicle is illustrated in Fig. 14 and will be more fully described hereinafter.

By the means herein described or by other means which will occur to those skilled in the art to which this invention pertains, the plate 27 may be firmly attached to the wheel of the vehicle, but preliminarily it is necessary to center the plate 27 accurately with respect to the center of the wheel. Therefore, the plate 27 is first loosely installed on the wheel, then centered as will next be described, and finally tightened on the wheel, remaining in tight relation until the balancing operation is completed.

In order to center the plate 27, a plurality of arms 34 are arranged to project and retract radially so that their outer extremities may engage the rim 21. Since the arms are so connected that their extremities are always equidistant from the center of the wheel, tightening the arms against the rim 21 will accurately and positively center the plate 27. It will be understood that if the rim 21 is damaged at any point, the arms 34 will be turned so that none of their outer extremities contacts such damaged portion. The arms 34 are held on radially-disposed hollow supports 35 fixed to plate 27 and have longitudinal slots 36 through which pass bolts 37 with enlarged heads which are threaded into supports 35 so that arms 34 may slide on the hollow supports 35 radially relatively to plate 27. Links 38 connect each of the arms 34 to a central ring 39, there being pins 41 and 42 at opposite ends of each link connecting the links to the ring and arms 34, respectively, and there being slots 40 in the supports 35 to permit pins 42 to slide radially with arms 34. It will be seen, particularly by reference to Fig. 4, that rotation of ring 39 in a clockwise direction projects arms 34 outwardly and rotation in the opposite direction will retract the arms. It is here noted that the ends of arms 34 are provided with an inner curved substantially convex face 34a, adapted to nest within the outer substantially concave laterally extending trim lip 21a of an automotive vehicle wheel rim 21b illustrated in Fig. 14. The outer portion of the ends of arms 34 are provided with a finger-like stop portion 34b arranged to abut against the outer edge of the lip 21a to limit movement of said arms inwardly toward the wheel in the event the concave portion of the rim lip is of greater width than the convex faces provided upon the ends of said arm portions. Thus, the arms 34 may be projected radially relative to the plate 17 to nest the portions 34a thereof within the lip 21a of a wheel rim, to which the balancing device is to be attached, and may be so securely nested in said lip that the wheel balancing device is held in position with respect to the road wheel being tested without the necessity of employing any other holding means, such as the clamp mechanism illustrated in Figs. 1 and 13 or the nut-forming member adapted to be attached to a lug, illustrated in Fig. 8. The use of the arms 34 as a centering mechanism to center the wheel balancing apparatus relative to the axis of rotation of the wheel being tested and as a means to attach the wheel balancing apparatus to the wheel in a secure and safe manner is the preferred embodiment and use of the present invention as it is the easiest manner of attachment and eliminates extra parts, such as the clamp mechanism herein described and illustrated (Fig. 13) or the nut-forming member (Fig. 8).

Ring 39 on its opposite side is pivotally connected to threaded nut 43 through which passes threaded rod 44. The opposite (and unthreaded) end of rod 44 passes through a sleeve 45 fixed to plate 27 and carries a knurled head 46 and collar 47 on the outer and inner sides of the sleeve 45, respectively. Therefore, by twisting head 46 ring 39 may be made to rotate and, as explained in the preceding paragraph, arms 34 to project and retract until the plate 27 is accurately centered.

Disposed between ring 39 and plate 27 is a split plate 49 having annular grooves 49a and and 49b in which, respectively, plate 27 and ring 39 may travel rotatably. The purpose of the split ring 49 is to enable rotation thereof relative to ring 39 and plate 27 so that the holes 20S, provided in said plate 49, may be rotated to a desired alignment with a lug nut 24 and, similarly, enable rotation of the plate 27, carrying rim-engaging arms 34 to a position relative to the rim of the wheel, which will enable a secure nesting engagement of the ends of said arms in the lip of the wheel rim to which they are to be engaged. I have found this to be a desirable feature inasmuch as many rims are deformed from various causes, such as contact of the road wheel vehicle rim with a gutter or other obstruction, and it is desirable to locate the rim-engaging arms with respect to the wheel rim at points where the wheel rim affords a secure nest.

It may be here noted that when the arms 34 are projected radially relative to the plate 27 to abut securely against the wheel rim lip 21a and tightened thereagainst, the split plate 49 is thereby locked securely against rotative movement relative to the plate 27 and ring 39.

The described braking function occurs through the clamping pressure developed upon plate 49 between ring 39 and plate 27 to hold frictionally said parts as a unitary structure. Thus, ring 39 and plates 27 and 49 form a member, referred to in the claims as a "first plate" or "support member," which rotates unitarily with the vehicle road wheel to which it is attached.

After the main plate 27 has been attached, centered, and firmly fastened in position to the road wheel, a secondary plate 55 is connected thereto so that plates 27 and 55 together form what may be termed a support member for the wheel balancing assembly. In the claims the expression "support member" is used as a term to describe the ring 39, split disc 49 and plate 27 as a unit and also to include said parts and plate 55 secured thereto. Spacer members 56, fixed to main plate 27, are interposed between main plate 27 and secondary plate 55 and insure that they are perfectly parallel. Bolts 57 passing through holes in the secondary plate 55 attach said secondary plate to the spacers. A split gear housing, consisting of two mating parts 58 and 59 which are bolted together and form a hollow casing for enclosing and journalling gears and gear shafts to be described later in this specification is rotatably held against secondary plate 55 by reinforcing plate 60 on the side of plate 55 opposite housing 58—59 so as to permit rotation but an absolute minimum of other movement of the housing with respect to the secondary plate. Reinforcing flange 62, abutting at its greater circumference the secondary plate and fixed to housing member 59 at its lesser circumference by means of ring 63 assists in supporting housing 58—59 against plate 55 so that its axis is perpendicular to the plane of plate 55 and further functions as a safety guard for the rotating parts. After plate 55 has been secured to plate 27, both those members and also housing 58—59 will rotate with the vehicle wheel to which they have been firmly attached.

Housing member 58 carries two annular discs 64 and 65 held on member 58 by rings 66 and 67, respectively, in such manner that the discs may be caused to rotate with respect to member 58 by mechanism hereinafter described. Each disc carries adjacent its periphery a weight 68, each weight being of the same mass and the same distance from the axis of rotation of housing 58—59. When the two weights are diametrically opposed, they counter-balance one another, but mechanism is installed in the housing 58—59 to cause discs 64 and 65 to rotate in opposite directions and hence to move toward each other, thus resulting in unbalance which increases as the weights move closer together and diminishes as they return toward diametrically opposed position. The amount of said unbalance may be adjusted to equal that necessary to overcome the unbalance of the wheel by rotating the housing 58—59 with respect to plate 55, and the angular position of the weights 68 may then be accurately determined and calibrated. The mechanism for creating this last-named rotation will next be described.

In order to rotate weights 68, while the wheel of the vehicle is revolving at a high rate of speed, mechanism is provided whereby by merely touching one or the other of knobs 69 and 71 the weights may be caused to move toward or away from each other. Knob 69 is pinned to shaft 72 journalled at its other end in housing member 58 and carrying adjacent its inner end bevel gear 73 which is pinned thereto; thus movement of knob 69 causes rotation of bevel gear 73 and this is transmitted to mating bevel gear 74. Knob 71, on the other hand, is pinned to sleeve 75, which fits over shafts 72 and is pinned at its opposite end to bevel gear 76 which also meshes with bevel gear 74. Rotation either of knob 69 or knob 71 results in rotation of gear 74, but since gears 73 and 76 are diametrically opposed with respect to the axis of gear 74, they cause rotation thereof in opposite directions.

Gear 74 is pinned to rod 77 which passes through the housing member 58 and is threaded exteriorly thereof, and carries a stop 78 at its outer end. A threaded nut 79 surrounds and engages rod 77 and may be made to move toward or away from the housing member 58 by rotation of said rod 77. Arcuate links 81 and 82 are pinned to nut 79 and are pinned at their opposite ends to discs 65 and 64, respectively. Thus, as the nut 79 is caused to move outwardly by rotation of gear 74, the weights 68 on discs 64 and 65 are caused to move toward each other as the plates rotate with respect to housing 58—59. When the nut 79 abuts the outside of housing member 58 the weights are diametrically opposed to each other and when the nut 79 abuts stop 78 they are closest to each other. The former relationship creates no unbalance whereas the latter relationship creates maximum balance.

The entire housing 58—59 and discs 64 and 65 with it may be caused to rotate about the horizontal axis of the housing by mechanism next to be described. Knob 83 is pinned to sleeve 84 which fits over sleeve 75 and pinion 85 is pinned to the opposite end of sleeve 84, engaging pinion 86 on stub shaft 87. Knob 88 is pinned to sleeve 89 which fits over sleeve 84 and is pinned at its opposite end to pinion 91 which meshes with idler 92 which in turn engages pinion 93 also pinned on shaft 87. Thus, rotation of knobs 83 and 88 cause rotation of shaft 87 in opposite directions. Shaft 87 carries worm 94 which meshes with worm wheel 95 on shaft 96 and the latter carries a pinion 97 which meshes with a circular rack 98 attached to plate 55. Therefore, by manipulation of knobs 83 and 88 the housing 58—59 (and together with it the discs 64 and 65) may be made to rotate relative to plate 55.

In operation of the balancing mechanism, after the plates 27 and 55 have been installed as has already been described, the vehicle wheel is caused to rotate. If the wheel is a rear wheel, rotation may be accomplished by jacking up the rear wheels and turning over the engine. If the wheel being balanced is a front wheel, then it is packed up and a roller placed to engage the tread of the tire, the roller being rotated by an electric motor, all as is well known in the art. With the weights 68 in diametrically opposed position, i. e., with nut 79 against housing member 58, the vehicle wheel is speeded up until the speed at which there is maximum dynamic balance is reached, this speed being apparent from visual inspection, and the wheel is kept rotating at that speed during the remainder of the balancing operation. Knobs 69, 71, 83 and 88 are now rotating all in the same direction at the same speed, but by touching the periphery thereof with the finger or a tool, any one of them may be given a relatively slower rotation with respect to housing 58—59, thereby retarding the rotation thereof while the housing continues to rotate at the speed of the vehicle wheel. Thus, by lightly touching knob 69, the weights 68 may be brought slightly toward each other and this will ordinarily increase the amount of dynamic unbalance and increase the vibration of the vehicle wheel as it revolves. Then by touching either knob 83 or 88 the housing 58—59 may be caused to rotate relative to place 55 until the amount of vibration is reduced to a minimum, thus indicating that the proper point on the circumference of rim 21 at which the weight 26 must be installed has been located. Then by further manipulation of knobs 69 and 71 the weights 68 may be brought toward or away from each other until vibration ceases, thus indicating that the mass of weight 26 has been determined, for the angular relationship of the weights 68 may be calibrated to give a reading of such weight—the smaller the angle between weights 68 the greater the required mass of weight 26.

The vehicle wheel is then stopped and two readings taken. One reading indicates the point on the rim 21 at which the weight 26 must be installed and this is taken from an arrow 99 painted on the flange 62 at a diameter overlying rod 77 and thus midway between weights 68; by projecting said arrow outward until it intersects rim 21 and marking the point of intersection with a chalk mark, the exact point where the weight 26 is to be installed is fixed. A window 100 is cut in the flange 62 adjacent the arrow 99 and through this window a second reading may be taken of the angular displacement of the disc 65, as shown on dial 102, which may be calibrated to give directly the number of ounces of lead which must be applied to the rim to bring the wheel into perfect dynamic balance.

It is apparent from the foregoing description that the present invention affords a convenient, easily installed, easily operated and accurate device for determining the optimum mass and position of a counterweight to be applied to correct dynamic unbalance of a vehicle wheel. By proper manipulation of readily accessible knobs 69, 71, 83 and 88 the wheel may be quickly brought into accurate balance and by making two readings of the convenient indicators 99 and 102 the operator may immediately determine said mass and position of the required counterweight. Not only is the balancing operation itself accomplished with a minimum of time and effort, but the preliminary attachment of the balancing mechanism to the wheel is made quickly and securely and the device may be adapted to fit a wide variety of wheel constructions. No special tools and very little skill is required either in the installation or the operation of the mechanism, yet extremely accurate results are always obtained.

Obviously, the wheel balancing device must be balanced per se, and for this reason counterweights may be attached to parts of the device as required. For example, a counterweight 301 may be attached to plate 27 by any conventional means, such as a screw connection, in order to counterbalance the weight of rod 44, sleeve 45, and head 46 relative to the center of the device. Similarly, holes may be drilled in plate 27 to reduce the weight thereof at certain loci relative to the center in order to provide a proper and accurate balance to the device.

While the invention has been described in more or less specific detail by way of illustration and example for purposes of clarity of explanation, it is understood that various changes, alterations and modification in design, use, purpose and construction may be practiced by those skilled in the art within the spirit of this invention and scope of the appended claims.

I claim:

1. Wheel engaging and supporting means for use in conjunction with a rimmed vehicle wheel attached to a vehicle by means of a plurality of polygonal-headed lug nuts, comprising, a plate, an elongated, cylindrical nut-engaging member having a slot extending inwardly from one end of said member diametrically across said member transverse to the axis of said member, said slot adapted to receive the head of a lug nut, a necked-in portion at said end of said member having a lesser interior diameter than the width of said slot, connecting means at the opposite end of said member for detachably connecting said member to said plate, and at least three radially extensible and retractable arms slidably mounted on said plate engageable with the vehicle wheel rim and operable to center said engaging and supporting means with respect to said vehicle wheel and holding said device on said wheel rim.

2. Wheel engaging and supporting mechanism comprising, a plate, at least three radially extensible and retractable arms, guideways for each of said arms mounted on said plate confining movement of said arms to a radial direction parallel to said plate, means manually operable simultaneously to extend or retract each of said arms an equal distance, and auxiliary means carried by said plate engageable with a cooperating portion of said vehicle wheel to lock said wheel and said engaging and supporting mechanism together.

3. Wheel engaging and supporting mechanism comprising, in combination, a plate, at least three radially extensible and retractable arms, guideways for each of said arms mounted on said plate confining movement of said arms to a radial direction parallel to said plate, means manually operable simultaneously to extend or retract each of said arms an equal distance, said guides comprising hollow members each having at least one flat surface on which said arms slide and having slot and pin connections with said arms to retain said arms against said flat surfaces, said means being partially contained within said hollow members and connecting with said arms through slots in said guides, and auxiliary means carried by said plates engageable with a cooperating portion of said vehicle wheel to lock said wheel and said engaging and supporting mechanism together.

4. A wheel engaging and supporting mechanism for use on wheels having laterally extending rim lips formed with a concave inner face comprising a plate, at least three radially extensible and retractable arms, the outer ends of said arms being formed to nest within the concave inner face of said rim lip, guide-ways for each of said arms mounted on said plate confining movement of said arms to a radial direction parallel to said plate, means manually operable simultaneously to extend or retract each of said arms an equal distance, and auxiliary means carried by said plate engagable with the cooperating portion of said vehicle wheel to lock said wheel and said engaging and supporting mechanism together.

5. Wheel engaging and supporting mechanism according to claim 2 for use on a wheel having a flange having a plurality of spaced apertures therein, wherein said auxiliary means comprises a hook carried by said plate and arranged to be inserted through one of the apertures of said wheel flange.

6. Wheel-engaging and supporting means for use in conjunction with a rimmed vehicle wheel attached to a vehicle by means of a plurality of polygonal-headed lug nuts comprising a plate, a plurality of elongated, cylindrical nut-engaging members, each having a slot extending inwardly from one end of said member diametrically across said member transverse to the axis of said member, said slot being adapted to receive the head of a lug nut, and a necked-in portion at said end of said member having a lesser interior diameter than the width of said slot, the opposite end of said member being substantially closed off, and connecting means at said opposite end of said member for detachably connecting said member to said plate.

7. Wheel-engaging and supporting means for use in conjunction with a rimmed vehicle wheel attached to a vehicle by means of a plurality of polygonal-headed lug nuts comprising a plate, a plurality of elongated, cylindrical nut-engaging members, each having a slot extending inwardly from one end of said member diametrically across said member transverse to the axis of said member, said slot being adapted to receive the head of a lug nut, and a necked-in portion at said end of said member having a lesser interior diameter than the width of said slot, the opposite end of said member being substantially closed off, and a pair of diametrically opposed flats formed on the exterior of said nut-engaging member.

References Cited in the file of this patent

UNITED STATES PATENTS

| Number | Name | Date |
|---|---|---|
| 45,359 | Sutter | Dec. 6, 1864 |
| 887,643 | Jackson | May 12, 1908 |
| 1,199,084 | Kraft | Sept. 26, 1916 |
| 1,299,764 | Normoyle | Apr. 8, 1919 |
| 1,321,739 | Haltman | Nov. 11, 1919 |
| 1,506,977 | Dichwolf et al. | Sept. 2, 1924 |
| 1,583,331 | Aley et al. | May 4, 1926 |
| 1,610,493 | Doherty | Dec. 14, 1926 |
| 1,744,340 | Smith | Jan. 21, 1930 |
| 1,990,928 | Bodendieck | Feb. 12, 1935 |
| 2,199,667 | Lannen | May 7, 1940 |
| 2,241,637 | Ernst et al. | May 13, 1941 |
| 2,372,891 | Fenton | Apr. 3, 1945 |
| 2,402,041 | Greenleaf et al. | June 6, 1946 |
| 2,475,502 | Holmes | July 5, 1949 |

FOREIGN PATENTS

| Number | Country | Date |
|---|---|---|
| 126,548 | Austria | Feb. 25, 1932 |
| 879,917 | France | Dec. 10, 1942 |